United States Patent [19]

Eto et al.

[11] Patent Number: 4,794,536
[45] Date of Patent: Dec. 27, 1988

[54] STEERING ANGLE DETECTION DEVICE

[75] Inventors: Kunihiko Eto, Toyota; Akihiro Ohno, Okazaki; Yutaka Mori, Toyokawa, all of Japan

[73] Assignee: Toyoda Koki Kabushiki Kaisha, Kariya, Japan

[21] Appl. No.: 781,237

[22] PCT Filed: May 21, 1985

[86] PCT No.: PCT/JP85/00279

§ 371 Date: Sep. 17, 1985

§ 102(e) Date: Sep. 17, 1985

[30] Foreign Application Priority Data

May 24, 1984 [JP] Japan ................. 59-106174

[51] Int. Cl.[4] ............................. B62D 6/02
[52] U.S. Cl. ................. 364/424.05; 364/559; 340/576; 180/280; 180/141; 116/31
[58] Field of Search ............. 364/424, 449, 559, 734; 340/73, 576; 280/707, 688; 180/272, 280, 141; 116/31

[56] References Cited

U.S. PATENT DOCUMENTS

| | | | |
|---|---|---|---|
| 4,199,817 | 4/1980 | Conkling et al. ................. | 364/734 |
| 4,280,189 | 7/1981 | Takato et al. ................... | 364/734 |
| 4,342,279 | 8/1982 | Seko et al. ...................... | 116/31 |
| 4,380,048 | 4/1983 | Kishi et al. ..................... | 364/734 |
| 4,463,347 | 7/1984 | Seko et al. ...................... | 180/272 |
| 4,555,761 | 11/1985 | Matsumoto et al. ............. | 364/449 |
| 4,564,833 | 1/1986 | Seko et al. ...................... | 180/272 |
| 4,565,997 | 1/1986 | Seko et al. ...................... | 340/576 |
| 4,581,607 | 4/1986 | Seko et al. ...................... | 180/272 |
| 4,586,032 | 4/1986 | Seko et al. ...................... | 340/576 |
| 4,593,358 | 6/1986 | Takeshima et al. ............. | 364/424 |
| 4,604,611 | 8/1986 | Seko et al. ...................... | 180/272 |
| 4,611,199 | 9/1986 | Seko et al. ...................... | 180/272 |
| 4,633,214 | 12/1986 | Miyata et al. ................... | 340/73 |

FOREIGN PATENT DOCUMENTS 59-143913  8/1984  Japan .
59-186775  10/1984 Japan .
60-76413   4/1985  Japan .
60-59905   4/1985  Japan .

Primary Examiner—Parshotam S. Lall
Assistant Examiner—V. N. Trans
Attorney, Agent, or Firm—Oblon, Fisher, Spivak, McClelland & Maier

[57] ABSTRACT

A steering angle detection device of the type wherein a computer (12) calculates a steering angle. When a steering shaft (20) is turned, pulse signals (SS1, SS2) are generated from an encoder (10). In response to these pulses signals (SS1, SS2), the computer (12) detects the rotational direction and angle of the steering shaft (20). When a sampling signal is generated in relation to the running of a vehicle, the computer (12) calculates a mean value of a cumulative past rotational angles and further calculates the rotational angle of the steering shaft (20) relative to a neutral position indicated by the mean value.

4 Claims, 4 Drawing Sheets

STEERING ANGLE DETECTION DEVICE

BACKGROUND OF THE INVENTION

1. Field of the Invention

The present invention relates to a steering angle detection device for detecting the steering angle of a steering wheel.

2. Discussion of Background

Recently, it has been practiced to control the steering force generated by a power steering apparatus in dependence upon vehicle speed and steering wheel rotational angle by utilizing a microcomputer. In a steering angle detection device used for detecting the rotational angle of a steering wheel for this purpose, there is used an encoder which outputs a pulse signal each time a steering shaft is rotated a unit angle, and the pulse signal is input to a microcomputer to be counted. A steering angle detection device of this type is advantageous in respect of required space as well as accuracy.

However, in the above-noted steering angle detection device using an encoder, the absolute steering angle cannot be detected, and the turning-off of an ignition switch causes a steering angle being stored in a memory to be lost. Thus, a relative rotational angle which is calculated taking as an origin the position where the steering wheel was located at a previous stop state is detected when electric power is subsequently supplied, whereby a neutral position (straight running condition) of the steering wheel cannot be discriminated.

As one method of solving this problem, it may be conceived to back up the microcomputer by a constant voltage circuit of a small power consumption lest the turning-off of the ignition switch should cause the content of the memory to be lost. However, this method cannot be a complete solution because no countermeasure can be taken in the event of a battery exhausted.

SUMMARY OF INVENTION

The present invention is created to solve the foregoing problems, and the object of the present invention is to provide an improved steering angle detection device capable of approximating a detected neutral position of a steering wheel gradually to a true neutral position as the vehicle runs after the supply of electric power.

Another object of the present invention is to provide an improved steering angle detection device capable of varying a detected neutral position of a steering wheel considerably slower than the variation in the rotational angle of the steering wheel.

Briefly, a steering angle detection device according to the present invention is provided with a counter whose count goes up or down depending upon the rotational direction of a steering shaft each time the steering shaft is turned a unit angle after the supply of electric power, thereby to detect the rotational angle of the steering shaft. When a sampling signal is generated in relation to the running of the vehicle, averaging means reads the rotational angle being stored in the counter and calculates a mean value of cumulative rotational angles. Rotational angle calculation means is further provided, which by calculation, converts the rotational angle being stored in the counter into a rotational angle which is calculated taking as a starting point the mean value or neutral position obtained by the averaging means.

With this configuration, since the neutral position is determined by calculating a mean value of cumulative rotational angles of the steering shaft and the steering angle is calculated taking the neutral position as a starting point, it is possible to detect the steering angle taking the running state of the vehicle subsequent to the supply of electric power into account even after the turning-off of electric power causes the stored steering angle to be lost. Particularly, since the steering angle is determined based upon a mean value of the cumulative steering angles, it is possible to approximate a neutral position obtained by calculation reliably to a true neutral position as the vehicle runs after the supply of electric power.

Other objects, features, and the attendant advantages of the present invention will be readily appreciated when the following embodiment is considered by reference to the accompanying drawings.

DETAILED DESCRIPTION OF THE PREFERRED EMBODIMENT

Figure 1:
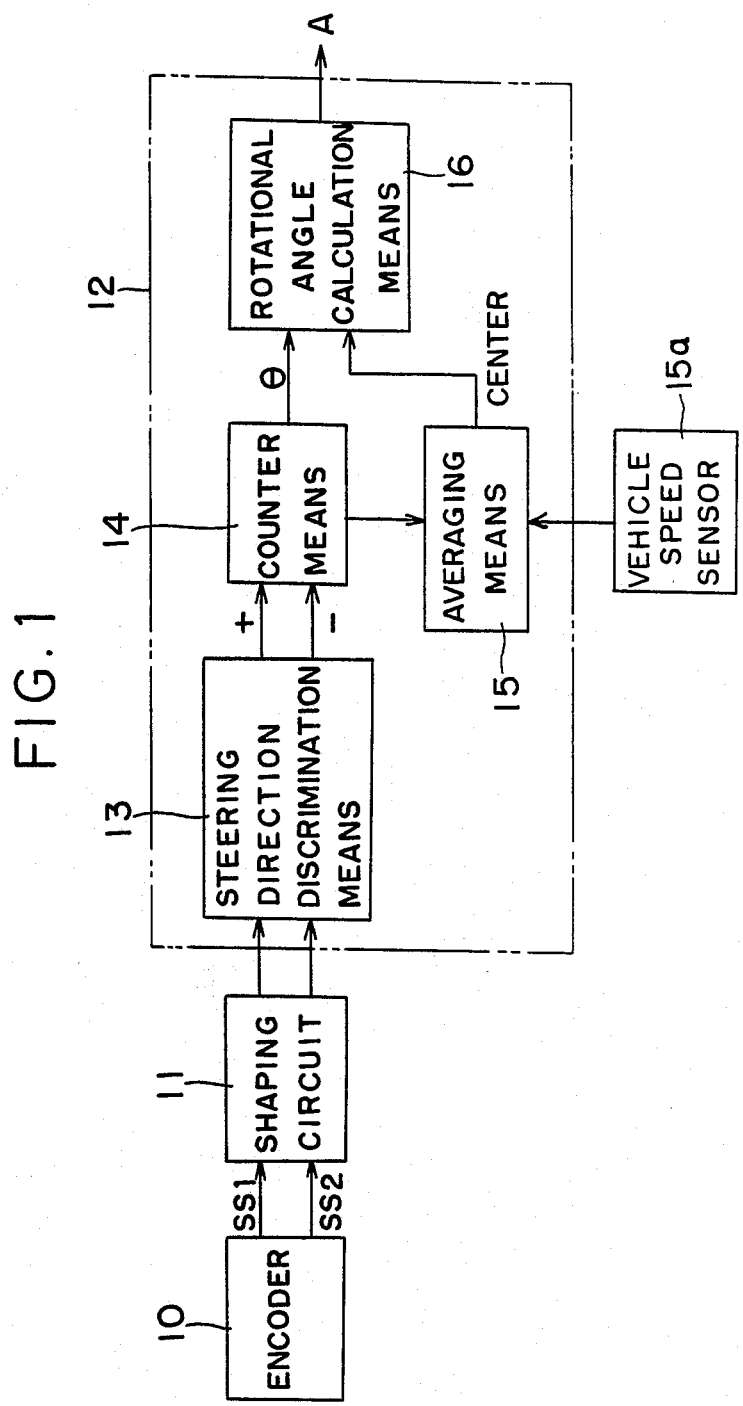
FIG. 1 is a block diagram of a control circuit for a rotational angle detection device.

An embodiment of the present invention will be described hereafter with reference to the drawings. Referring now to FIG. 1, 10 denotes an encoder, 11 denotes a shaping circuit, and 12 denotes a computer. This computer 12 is composed of steering direction discrimination means 13, counter means 14, averaging means 15, and rotational angle calculation means 16.

Figure 2:
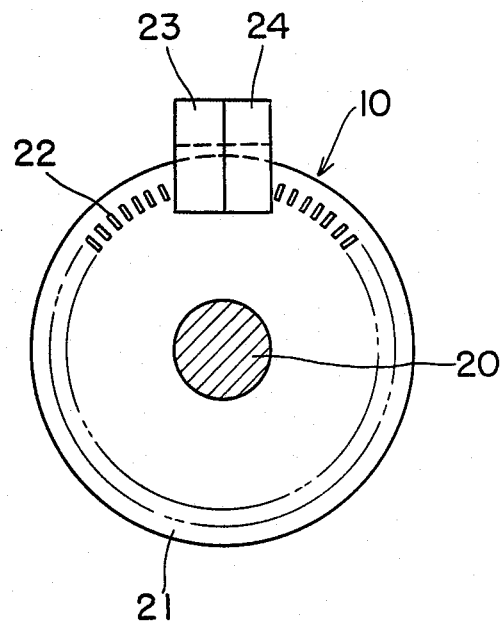
FIG. 2 is a view showing an encoder.
Figure 3:
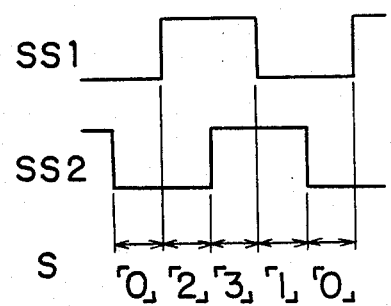
FIG. 3 is a chart of the encoder output waves.

Referring now to FIG. 2, 20 denotes a steering shaft, which is connected to a steering wheel (not shown) at one end thereof and to a steering mechanism (not shown) at the other end thereof. A rotary disc 21 is secured to the steering shaft 20, and a plurality of slits 22 are formed at a circumferential porion of the rotary disc 21 at an equiangular intervals. An A-phase sensor 23 and a B-phase sensor 24 each of which comprises a pair of light emission and responsive elements facing each other with the rotary disc 21 therebetween are disposed respectively at circumferential angular positions with a phase difference corresponding to a ¼ cycle, and these sensors 23, 24 are secured to a fixed part such as a steering column. The sensors 23, 24 are responsive to light passing through the slits 22 to generate pulse signals SS1 and SS2, whose phases are shifted a ¼ cycle as shown in FIG. 3, each time the steering shaft 20 is turned a unit angle. These rotary disc 21 and sensors 23, 24 constitute the aforementioned encoder 10.

As shown in FIG. 3, the steering direction discrimination means 13 divides one cycle of the pulse signal into four region signals S including "0" through "3", depending upon combinations of the two pulse signals SS1, SS2 which are generated by the encoder 10 with the pulse difference corresponding to a ¼ cycle, and discriminates the rotational direction of the steering wheel by reference to a present region signal and a previous region signal. It is to be noted that the region signals are divided in such a way that they respectively have "0" with the signals SS1 and SS2 being both at a low level, "1" with the signal SS1 being at the low level but the signal SS2 being at a high level, "2" with the signal SS1 being at the high level but the signal SS2 being at the low level, and "3" with the signals SS1 and SS2 being both at the high level.

Figure 4:
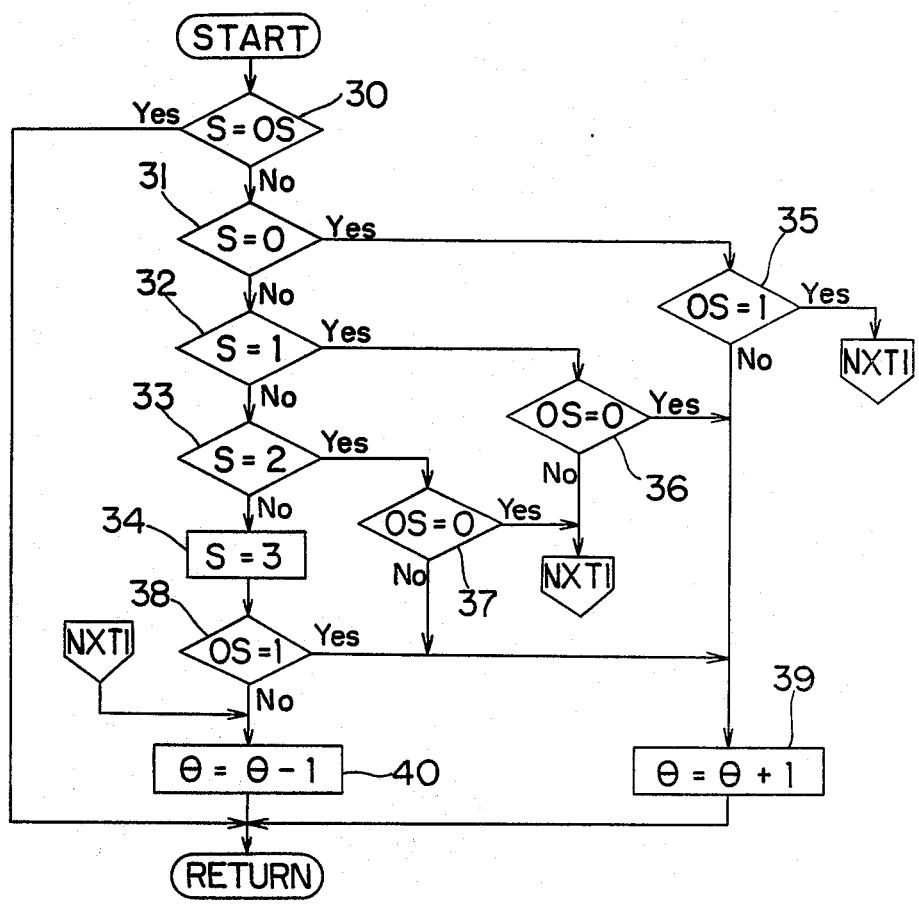
FIGS. 4 and 5 are flow charts.

The steering direction discrimination means 13 and the counter means 14 will be described with reference to a flow chart shown in FIG. 4. It is assumed herein that in FIG. 4, S represents a present region signal whereas OS represents a previous region signal. First of all, it is ascertained in step 30 whether S is the same as OS or not, and when "Yes" is answered, the program return is effected because the steering wheel is regarded as having been stopped. If "No", to the contrary, step 31 is then reached to ascertain whether S is "0" in step 31, whether S is "1" in step 32 and whether S is "2" in step 33, and when "No" is answered in any of these steps, S is judged to be "3" in step 34. When S is judged to be "0" in stepZ 31, step 35 is reached to ascertain whether OS is "1" or not. When "Yes" is answered, the rotational direction of the steering wheel is judged to be a positive-going direction (clockwise direction), and in step 39, 1 is added to the rotational angle $\theta$ being stored in a memory of the computer 12. When the result of ascertainment in step 35 is "No", the steering wheel is judged to being turned in a reverse direction (counterclockwise direction), whereby 1 is subtracted from the rotational angle $\theta$ being stored in the memory in step 40. Likewise, when S is judged to be "1" in step 32, whether OS is "0" or not is ascertained in step 36. Further, when S is judged to be "2" in step 33, whether OS is "0" or not is ascertained in step 37, and when S is seen to be "3", whether OS is "1" or not is ascertained in step 38. Subsequently, as described above, the addition to, or subtraction from, the content of the rotational angle $\theta$ being stored in the memory is performed depending upon the results of these ascertainments in step 39 or 40.

Figure 5:
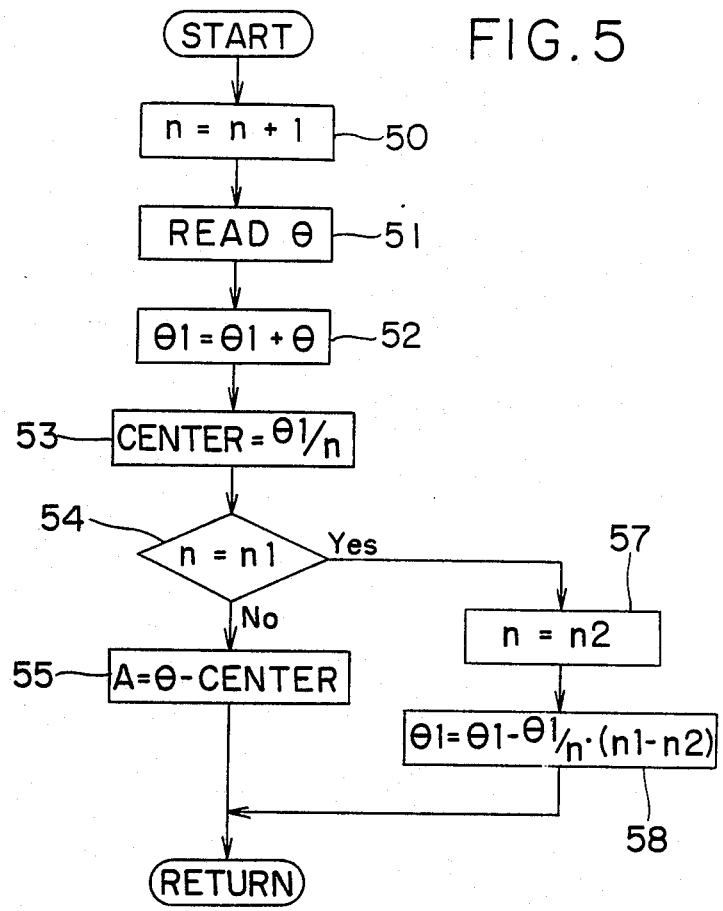

The averaging means 15 and the rotational angle calculation means 16 will be described hereafter with reference to a flow chart shown in FIG. 5. When the vehicle speed sensor 15a outputs a pulse signal each time the vehicle runs a unit distance, an interrupt signal is forwarded, responsive to which a program shown in FIG. 5 is started. First of all, in step 50, 1 is added to a memory counter which cumulates processing numbers n, and the rotational angle $\theta$ being stored in the counter means 14 is read in step 51. In step 52, the rotational angle $\theta$ is added to the content $\theta 1$ of another memory counter which cumulates the rotational angles $\theta$ per unit running distance, and in step 53, a mean value of the rotational angle $\theta$ is calculated by dividing the cumulative value $\theta 1$ of rotational angles by the cumulation number n, so as to be stored as CENTER in the memory. It is ascertained in step 54 whether the cumulation number n has reached a set value n1 or not, and when "No" is answered, the CENTER is subtracted from the rotational angle $\theta$ to output the result as a steering angle A.

In this manner, the rotational angle $\theta$ is read each time the vehicle runs the unit distance, to calculate the CENTER from the mean value, and the rotational angle $\theta$ is then modified to a rotational angle taking the CENTER as a starting point, whereby the steering angle A which is almost reliable can be obtained.

More specifically, in the event that the ignition switch is turned on with the vehicle being stopped, the steerable wheels are not in a fixed orientation, and thus, the rotational angle $\theta$ obtained based upon the output of the encoder 10 indicates an angle which is calculated taking as the starting point a position where the steering wheel is located at the time of the supply of electric power. Moreover, although the steering wheel is usually turned right or left across the actual neutral position, the straight driving is kept during almost all the part of running except for such a particular case as a mountain road driving.

Figure 6:
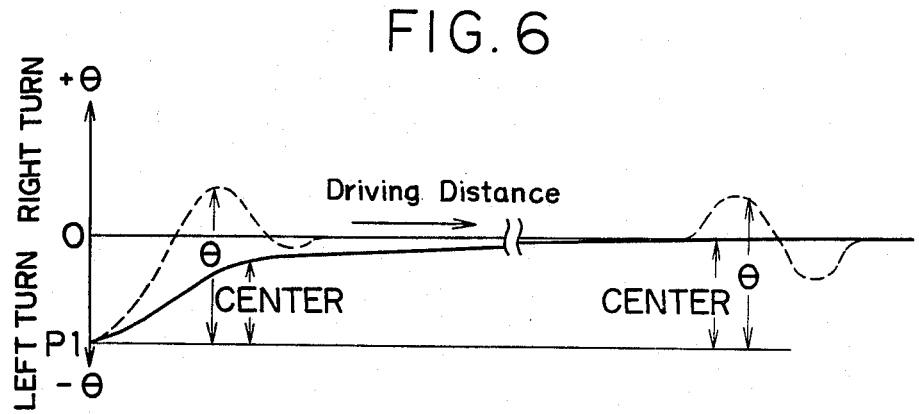
FIG. 6 is an explanatory view for describing the operation.

Accordingly, assuming now that the ignition switch is turned on in such a state that the steering wheel has been almost fully turned left as indicated at P1 in FIG. 6 and that the steering wheel is manipulated as indicated by the broken line after the starting of running, the rotational angle stored in the memory is calculated taking the P1 position as a starting point. Further, the CENTER obtained in step 53 indicates at an early stage a value which deviates from the actual neutral position towards the P1 position as indicated by the solid line in FIG. 6, that is, a smaller value than the angle of the P1 relative to the neutral position. However, as the running distance increases, the CENTER is approximated gradually to the neutral position, and after the vehicle runs several hundred meters for example, the CENTER comes into approximate coincidence with the neutral position. Therefore, a large turn of the steering wheel in such a state has almost no influence on the value of the CENTER.

In the flow chart shown in FIG. 5, when the result of ascertainment in step 54 changes to "Yes", the cumulation number n is modified to n2 (0<n2<n1) in step 57, and a calculation according to the following equation is performed in step 58 to obtain a revised cumulative rotational angle $\theta 1$ proportional to the modified cumulation number n2, whereby the overflow of $\theta 1$ can be prevented.

$$\theta 1 = \theta 1 - (\theta 1/n1) \times (n1 - n2)$$

Although the above described embodiment is directed to an example wherein the rotational angle $\theta$ is sampled each time the vehicle runs a unit distance, such sampling may be done each time the vehicle runs a unit time period.

We claim:

1. A steering angle detection device for a motor vehicle, comprising:
   a rotary disc rotatable synchronously with a steering shaft;
   an encoder for generating a first pulse signal each time said rotary disc rotates a unit angle in one direction and for generating a second pulse signal each time said rotary disc rotates said unit angle in the other direction;
   counter means responsive to said first and second pulse signals from said encoder for respectively increasing or decreasing its content depending upon the rotational directions of said steering shaft;
   a sampling signal generator for generating sampling signals at a predetermined interval;
   rotational angle reading means for reading rotational angle data stored in said counter means, in response to each of said sampling signals from said sampling signal generator;
   averaging means, operable each time new rotational angle data is read by said rotational angle reading means, for calculating a mean value of a plurality of rotational angle data which has been previously read by said rotational angle reading means, said mean value representing a nominal neutral position of said steering shaft; and rotational angle calculation means for calculating the rotational angle of said steering shaft relative to said nominal neutral position thereof based upon said mean value calculated by said averaging means and said new rotational angle data.

2. A steering angle detection device as set forth in claim 1, further comprising:

means for generating four states signals based upon the combinations of said first and second pulse signals from said encoder and for discriminating the rotational directions of said steering shaft based upon the change from one of said four states signals to another.

3. A steering angle detection device as set forth in claim 1, wherein said averaging means comprises:

accumulating means for calculating a cumulative value of said plurality of steering angle data by adding said new rotational angle data to a previous cumulative value each time said new rotational angle data is read by said rotational angle reading means;

cumulative number count means for incrementing a cumulative number stored therein each time said new rotational angle data is added to said previous cumulative value; and dividing means for dividing said cumulative value calculated by said accumulating means, by said cumulative number stored in the cumulative number count means so as to calculate said mean value.

4. A steering angle detection means as set forth in claim 3, further comprising:

means for subtracting from a cumulative value of said rotational angle data a value determined by said cumulative value when said cumulative number reaches a predetermined value, so as to prevent said cumulative value from exceeding a predetermined value.

* * * * *